US007881869B2

(12) United States Patent
Clayton et al.

(10) Patent No.: US 7,881,869 B2
(45) Date of Patent: Feb. 1, 2011

(54) METHOD AND APPARATUS FOR EVALUATING DATA ASSOCIATED WITH AN OFFSHORE ENERGY PLATFORM

(75) Inventors: Matthew Clayton, Houston, TX (US); Oliver C. Mullins, Ridgefield, CT (US); Timothy T. Nguyen, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 743 days.

(21) Appl. No.: 11/648,089

(22) Filed: Dec. 29, 2006

(65) Prior Publication Data

US 2008/0162085 A1    Jul. 3, 2008

(51) Int. Cl.
  *G06F 11/00* (2006.01)
(52) U.S. Cl. ...................................................... 702/18
(58) Field of Classification Search .................. 702/6, 702/13, 188
  See application file for complete search history.

(56) References Cited

U.S. PATENT DOCUMENTS

| | | | | |
|---|---|---|---|---|
| 4,074,243 A * | 2/1978 | Bogen et al. ................ 340/633 |
| 4,353,121 A * | 10/1982 | Ray et al. ...................... 367/21 |
| 4,492,270 A * | 1/1985 | Horton ........................ 166/358 |
| 5,045,859 A * | 9/1991 | Yetter ......................... 342/414 |
| 5,706,896 A * | 1/1998 | Tubel et al. ................. 166/313 |
| 5,975,204 A * | 11/1999 | Tubel et al. ................. 166/313 |
| 6,192,230 B1 * | 2/2001 | van Bokhorst et al. ... 455/343.3 |
| 6,435,773 B1 * | 8/2002 | Khachaturian ............... 405/202 |
| 6,560,223 B1 * | 5/2003 | Egan et al. ................... 370/356 |
| 6,591,775 B2 * | 7/2003 | Robinson ..................... 114/264 |
| 6,652,625 B1 * | 11/2003 | Tipler et al. ..................... 95/82 |
| 6,980,929 B2 * | 12/2005 | Aronstam et al. ............ 702/188 |
| RE38,985 E  * | 2/2006 | Boatman et al. ............ 700/276 |
| 6,999,903 B2 * | 2/2006 | Ikeda et al. ................. 702/188 |
| 7,009,550 B2 * | 3/2006 | Moeller-Jensen ............ 342/52 |
| 7,100,421 B1 * | 9/2006 | Herring ..................... 73/23.35 |
| 7,103,511 B2 * | 9/2006 | Petite ........................ 702/188 |
| 7,107,820 B2 * | 9/2006 | Nunnally et al. ............... 73/40 |
| 7,124,030 B2 * | 10/2006 | Ellis ............................... 702/9 |
| 7,242,317 B2 * | 7/2007 | Silvers ..................... 340/853.3 |
| 7,336,168 B2 * | 2/2008 | Kates ...................... 340/539.18 |
| 7,337,078 B2 * | 2/2008 | Bond et al. ................... 702/51 |
| 2004/0003020 A1 * | 1/2004 | Yik et al. .................... 709/102 |
| 2004/0095506 A1 * | 5/2004 | Scott .......................... 348/373 |
| 2004/0098202 A1 * | 5/2004 | McNeil et al. ................ 702/12 |
| 2005/0044261 A1 * | 2/2005 | Saxena ....................... 709/236 |
| 2005/0269499 A1 * | 12/2005 | Jones et al. .............. 250/269.1 |
| 2009/0039255 A1 * | 2/2009 | Andrews et al. ............ 250/301 |

* cited by examiner

*Primary Examiner*—Aditya Bhat
(74) *Attorney, Agent, or Firm*—Duong L. Nguyen; Bryan P. Galloway; Robert P. Lord

(57) ABSTRACT

A method for transferring data from an unmanned offshore energy platform to a manned offshore energy platform. The method includes obtaining the data on the unmanned offshore energy platform from a monitoring device, wherein the monitoring device is configured to monitor at least one environmental condition surrounding the unmanned offshore energy platform. The method further includes formatting the data for transmission. In addition, the method includes wirelessly transmitting the data from the unmanned offshore energy platform to the manned offshore energy platform.

31 Claims, 10 Drawing Sheets

METHOD AND APPARATUS FOR EVALUATING DATA ASSOCIATED WITH AN OFFSHORE ENERGY PLATFORM

BACKGROUND

Offshore production of oil and natural gas may be performed using a variety of methods. One such method involves using an offshore energy platform, which is a platform supported by or moored to the floor of a body of water. The offshore energy platform extracts hydrocarbons from underground formations. The platform houses workers and machinery needed to drill and/or produce oil and natural gas from beneath the seafloor. These platforms may each have a number of wellheads, allowing access to reservoirs of energy resources located at great distances from the platform. A typical offshore energy platform is self-sufficient. For example, an offshore energy platform may be an offshore platform that houses all of the equipment necessary to process energy resources such that these natural resources can be delivered to markets via pipelines or tanker vessels.

For safety and efficiency reasons, many offshore energy platforms are unmanned, performing most functions completely autonomously. An unmanned offshore energy platform is a platform that typically functions without human workers, while a manned offshore energy platform is platform that typically functions with human workers. To ensure the proper regular operation of unmanned offshore energy platforms, numerous unmanned offshore energy platforms are often located in the vicinity of a manned offshore energy platform. Thus, workers are located at a manned offshore energy platform, which may be in the vicinity of one or more unmanned offshore energy platforms. Visits to the unmanned offshore energy platforms are occasionally necessary. This arrangement of unmanned offshore energy platforms in the vicinity of a manned offshore energy platform allows workers at the manned offshore energy platform to visit an unmanned offshore energy platform when necessary.

Operators of such platforms incur great costs. For example, costs may arise because governments and other organizations require an offshore energy platform operator to monitor the platform for pollution. Normally, an unmanned offshore energy platform is physically surveyed by visiting the platform by helicopter or boat. The frequency of these visits is determined by the production level of the well(s) at the platform. It is not uncommon for an operator of an unmanned offshore energy platform to visit the platform daily. Additional costs arise because operators check for proper operation and compliance with governmental regulations, and ensure that the platforms have not been tampered with or damaged.

SUMMARY OF INVENTION

In general, in one aspect, the invention relates to a method for transferring data from an unmanned offshore energy platform to a manned offshore energy platform. The method includes obtaining the data on the unmanned offshore energy platform from a monitoring device, wherein the monitoring device is configured to monitor at least one environmental condition surrounding the unmanned offshore energy platform, formatting the data for transmission, and wirelessly transmitting the data from the unmanned offshore energy platform to the manned offshore energy platform.

In general, in one aspect, the invention relates to a method of evaluating data associated with an unmanned offshore energy platform. The method includes receiving formatted data from the unmanned offshore energy platform wherein the data comprises at least one of a video signal and a sensor measurement and sending a control signal responsive to at least one of the video signal and the sensor measurement indicating a hydrocarbon above a predetermined threshold value.

In general, in one aspect, the invention relates to a system for evaluating data. The system includes an unmanned offshore energy platform. The unmanned offshore energy platform includes at least one monitoring device on the unmanned offshore energy platform configured to monitor at least one environmental condition surrounding the unmanned offshore energy platform and to detect at least one hydrocarbon above a predetermined threshold, a first local wireless access point on the unmanned offshore energy platform and wirelessly connected to the at least one monitoring device configured to receive data from the at least one monitoring device, a first switch on the unmanned offshore energy platform and connected to the first local wireless access point configured to format the data from the first local wireless access point to form formatted data, and a first wireless transceiver operatively coupled to the first switch, wherein the first wireless transceiver comprises a first antenna configured to send formatted data.

Other aspects of the invention will be apparent from the following description and the appended claims.

DETAILED DESCRIPTION

Exemplary aspects of the invention will be described with reference to the accompanying figures. Like items in the figures are shown with the same reference numbers. Further, the use of "ST" in the figures is equivalent to the use of "Step" in the detailed description below.

In aspects of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Aspects of the invention relate to a method and apparatus for transferring data in an oilfield environment. More specifically, one or more aspects of the invention relate to a method and apparatus for transferring data from an unmanned offshore energy platform to a manned offshore energy platform.

Figure 1:
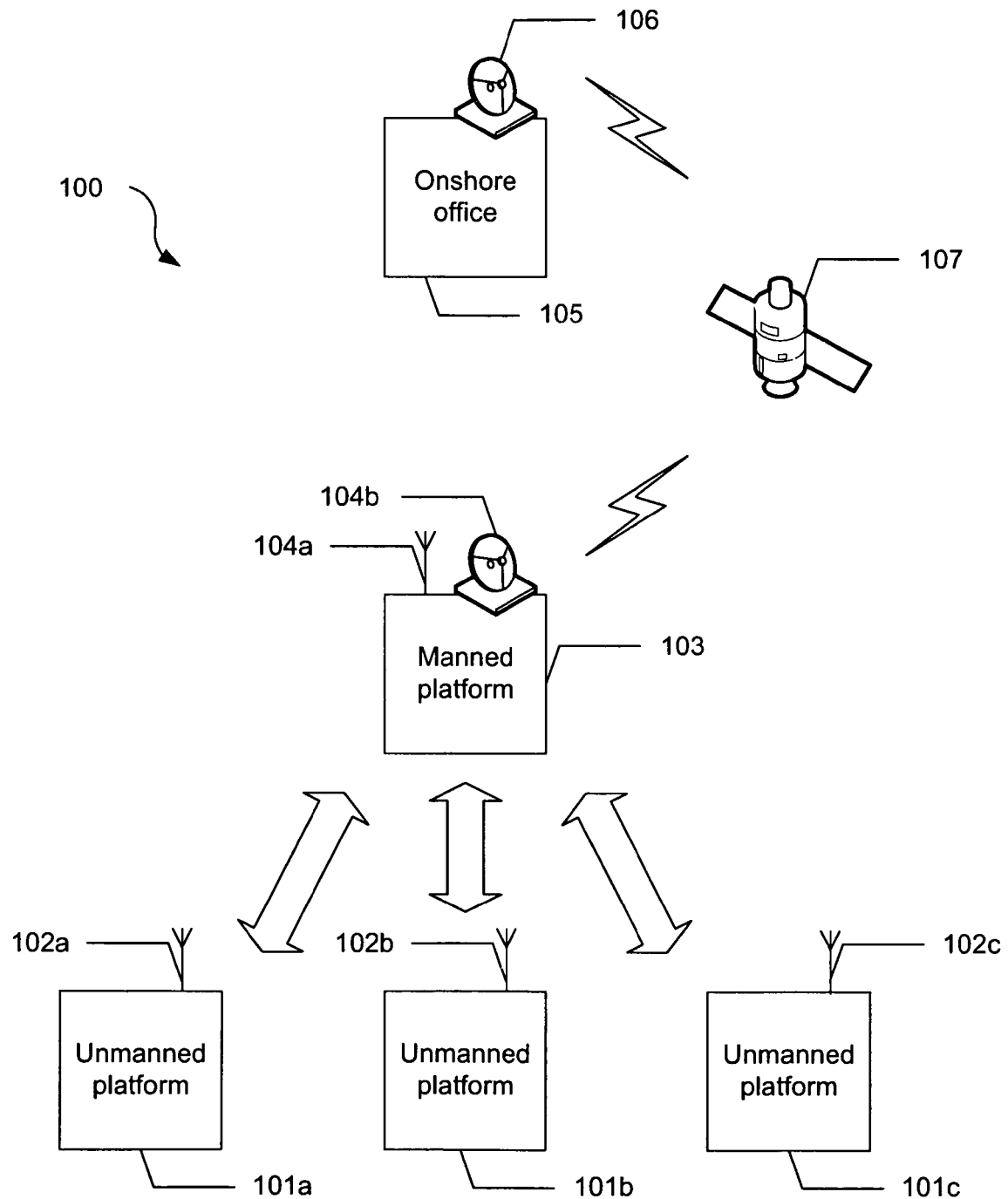
FIG. 1 shows a block diagram of a system for transferring data in accordance with one or more aspects of the invention.

FIG. 1 shows a block diagram of a system in accordance with one or more aspects of the invention. More specifically, FIG. 1 shows a wireless system (100) including a plurality of unmanned offshore energy platforms (101a, 101b, 101c), a manned offshore energy platform (103), and an onshore office (105).

The unmanned offshore energy platforms (101a, 101b, 101c) and the manned offshore energy platform (103) each have at least one device for transmitting data wirelessly to each other, such as an antenna (102a, 102b, 102c, 104a) and associated components necessary to transmit a signal. Further, the manned platform (103) and the onshore office (105) each have at least one means for transmitting data wirelessly to each other, such as, for example, a satellite antenna (104b, 106) or a very small aperture terminal (VSAT) interface. Therefore, in an aspect of the invention, each of the unmanned offshore energy platforms (101a, 101b, 101c) may communicate with the manned offshore energy platform (103), and the manned offshore energy platform (103) may communicate with the onshore office (105). While particular forms of wireless communication are described herein, any suitable method of transmitting a signal may be used.

In an aspect of the invention, unmanned offshore energy platforms (101a, 101b, 101c) communicate bidirectionally with the manned platform (103) and onshore office (105). In other words, data is wirelessly transferred between the unmanned offshore energy platforms (101a, 101b, 101c) and the manned offshore energy platform (103) (in either direction) via communications devices such as the antennas (102a, 102b, 102c, 104a). Further, data is transferred between the manned offshore energy platform (103) and the onshore office (105) (in either direction) via a communications link, such as, for example, the satellite (107).

Data sent by the unmanned offshore energy platforms (101a, 101b, 101c), the manned offshore energy platform (103), and the onshore office (105) may take a number of forms, discussed in greater detail below. For example, the unmanned offshore energy platforms (101a, 101b, 101c) may include devices to sense or record information surrounding each respective unmanned offshore energy platform regarding, for example, the leakage of hydrocarbons, other gases associated with hydrocarbons, or other unaccounted for activity (e.g., unauthorized persons accessing the platform). In an aspect of the invention, such information is recorded or sensed by a monitoring device (discussed below). Data received by an unmanned offshore energy platform (101a, 101b, 101c) from the manned offshore energy platform (103) or the onshore office (105) may include, but is not limited to, control information for sensors, cameras, or other sensing devices. This control information is asserted in the form of one or more control signals. A control signal is a signal that modifies the operation of the monitoring devices present on the unmanned offshore energy platform.

Unmanned offshore energy platforms (101a, 101b, 101c) transmit data, via communications devices, such as antennas (102a, 102b, 102c), to the manned offshore energy platform (103). Manned offshore energy platform (103) receives data via a communications device, such as an antenna (104a). Similarly, data sent by the manned offshore energy platform (103) is transferred wirelessly, via a communications device such as the antenna (104a), from the manned offshore energy platform (103) to an unmanned offshore energy platform (101a, 101b, 101c), where the data is received by a communications device, such as an antenna (102a, 102b, 102c) in accordance with one or more aspects of the invention.

Data is also transferred wirelessly via the satellite antenna (104b), from/to the manned offshore energy platform (103) to/from the onshore office (105) via the satellite antenna (106), through the satellite (107). Those skilled in the art will appreciate that a number of forms of communication may be used to transfer data between the unmanned offshore energy platforms (101a, 101b, 101c) and the manned offshore energy platform (103). Similarly, multiple forms of communication may be used to transfer data between the manned offshore energy platform (103) and the onshore office (105). Specifically, for example, wireless Ethernet using one or more of the IEEE 802.11a/b/g wireless LAN standards may be used to communicate between certain platforms. Alternatively, a point-to-point wireless solution such as the IEEE 802.16 wireless standard used in World Interoperability for Microwave Access, Inc., (WiMAX) technology, may be used.

Because the manned offshore energy platform (103) must be able to send data in multiple directions, an omnidirectional antenna may be used at the manned offshore energy platform (103) to send and receive data. An omnidirectional antenna is an antenna that has an essentially non-directional pattern in a given plane of the antenna and a directional pattern in any orthogonal plane. In other words, in one plane of an omnidirectional antenna, the omnidirectional antenna radiates electromagnetic energy essentially uniformly in all directions. Common omnidirectional antennas include whip antennas, vertically oriented dipole antennas, discone antennas, and horizontal loop antennas. Thus, with an omnidirectional antenna, the manned offshore energy platform (103) sends and receives data to and from various unmanned offshore energy platforms (101a, 101b, 101c), which are located in multiple directions from the manned offshore energy platform (103). The unmanned offshore energy platforms (101a, 101b, 101c) are located essentially in the same horizontal plane in which the manned offshore energy platform (103) is located.

Further, as each of the unmanned offshore energy platforms typically send and receive data to and from a predetermined manned offshore energy platform, each of the unmanned offshore energy platforms may use a directional antenna. A directional antenna is an antenna that radiates or receives electromagnetic waves more effectively in some directions than others. Common directional antennas include yagi antennas, log-periodic antennas, and corner reflectors. Thus, because unmanned offshore energy platforms (101a, 101b, 101c) and a manned offshore energy platforms (103) are typically stationary with respect to each other, an unmanned offshore energy platform (101a, 101b, 101c) may send and receive data only in the direction of the manned offshore energy platform (103).

If distances are too great or conditions do not permit for terrestrial communication solutions, satellite communication may also be used. Further, while particular wireless standards for wireless radio communication have been discussed, other communication forms, such as, for example, wired or wireless optical data transfer may be used in an aspect of the invention.

Further, while FIG. 1 shows particular channels of communication between the unmanned offshore energy platforms (101a, 101b, 101c), the manned offshore energy platform (103), and onshore office (105), communication channels are not limited to these paths. For example, if the manned offshore energy platform (103) becomes unavailable for communication, an unmanned offshore energy platform (e.g., 101a) may seek a different manned offshore energy platform (not shown) for communication, or a different unmanned offshore energy platform (e.g., 101b, 101c), which may in turn relay data from the first unmanned offshore energy platform (101a) to another manned offshore energy platform out of the range of the first unmanned offshore energy platform (101a). Similarly, if onshore office (106) becomes unavailable for communication, the manned offshore energy platform (103) may seek a different onshore office (not shown) for communication.

Figure 2:
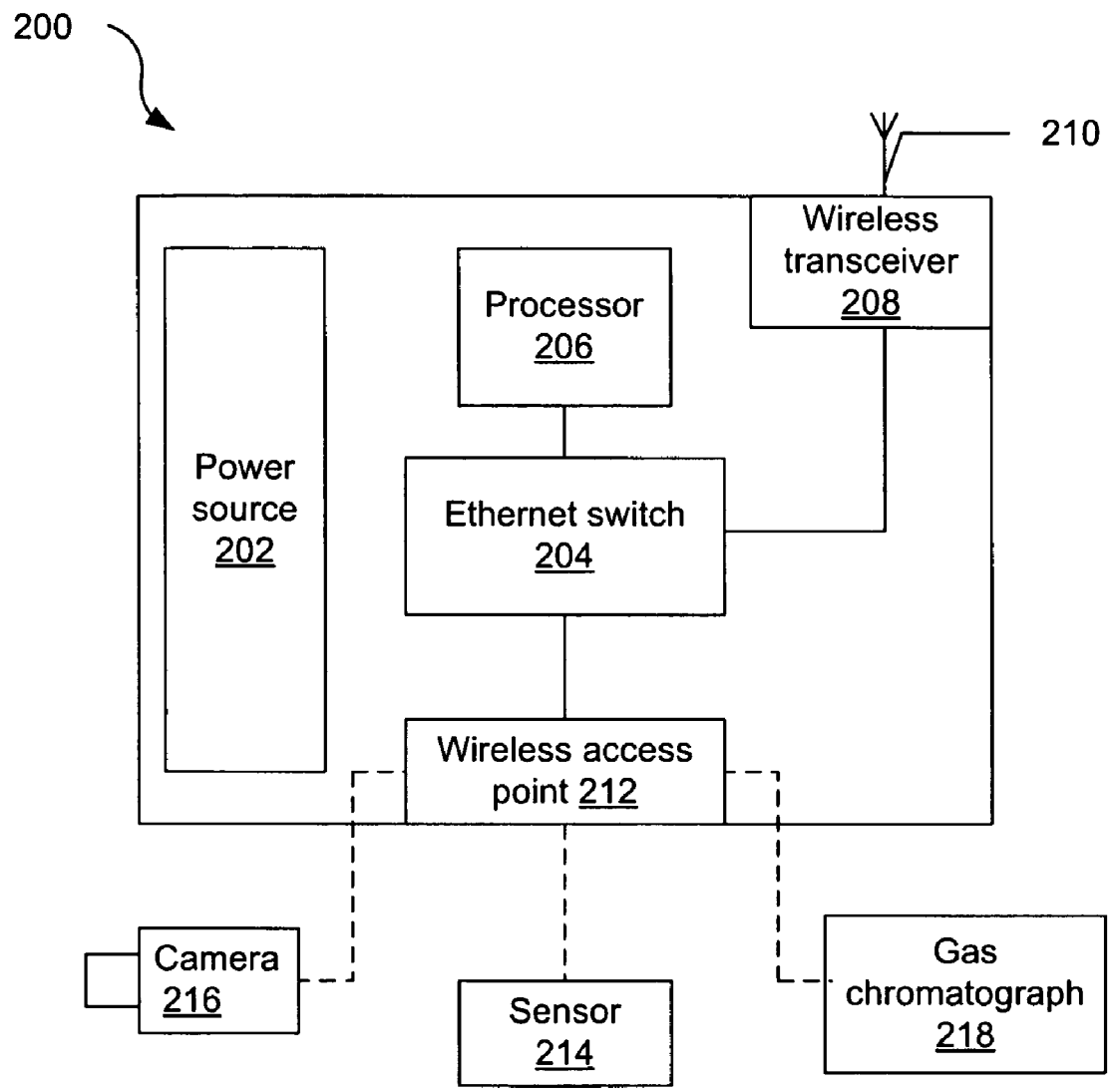
FIG. 2 shows a block diagram of a monitoring system on an unmanned platform in accordance with one or more aspects of the invention.

FIG. 2 shows a block diagram of a monitoring system (200) for use on an unmanned offshore energy platform in accordance with one or more aspects of the invention. The monitoring system is located on an unmanned offshore energy platform, for example, unmanned offshore energy platforms 101a, 101b, and 101c of FIG. 1. The monitoring system (200) sends data from an unmanned offshore energy platform to other platforms. In FIG. 2, the monitoring system (200) includes a power source (202) coupled to power elements that are a part of the monitoring system (200). The monitoring system (200) also includes processor (206) coupled to a switch (204). The processor processes (206) inputs and operates controllable sensors, as well as providing high level communications processing for the monitoring system (200). The switch (204) is a device that routes packets between two segments in a network. A segment is, for example, the wireless link between unmanned offshore energy platform (101a in FIG. 1) and manned offshore energy platform (103 in FIG. 1). For example, an Ethernet switch transports and routes packets between two segments using Ethernet protocols. The segment may be between the Ethernet switch (204) and a wireless transceiver, for example, wireless transceiver (208). The wireless transceiver (208) formats data from the segment of the Ethernet switch for transmitting wirelessly to a receiving node, for example, a manned offshore energy platform.

Continuing with FIG. 2, the Ethernet switch (204) is connected to a wireless access point (212). The wireless access point (212) is connected to one or more sensors (214), cameras (216), or other devices, such as a gas chromatograph (218). The sensor (214), the camera (216), and the gas chromatograph (218) are examples of monitoring devices. As discussed above, a monitoring device is a device that senses or records information surrounding an unmanned offshore energy platform (i.e., "environmental conditions"). Environmental conditions are conditions that affect the production of energy on an offshore platform and include, for example, the leakage of hydrocarbons, other gases associated with hydrocarbons, storm damage, or other suspicious (or otherwise unaccounted for) activity (e.g., unauthorized persons accessing the platform).

The wireless access point (212) is one example of a wireless access point. A wireless access point is a device that connects wireless devices together to form a wireless network. The wireless access point usually connects to a wired network, and can relay data between wireless devices and wired devices. Wireless access points have Internet Protocol (IP) addresses for configuration and identification purposes. As human visits are occasionally necessary on an unmanned offshore energy platform, the wireless access point (212) may include available connections for a computer (not shown) or a telephone such as a Voice Over Internet Protocol (VoIP) telephone. Service personnel using a computer may access the local network on the unmanned offshore energy platform to perform maintenance activities. Similarly, service personnel may contact other personnel with the VoIP telephone. Thus, these devices may be connected to the wireless access point (212). Further, the wireless access point (212) is configured to receive data from programmable logic controls ("PLCs") corresponding to certain operations of the unmanned offshore energy oil platform, such as monitoring data sent from the PLCs for interpretation by an operator.

In some aspects of the invention, the wireless access point (212) is part of the Ethernet switch (204). Further, although monitoring devices such as the sensor (214) and the camera (216) are shown and described as being wirelessly connected to the wireless access point (212), in an aspect of the invention, the wireless access point (212) also accepts wired connections. In other words, the monitoring devices are connected to the wireless access point (212) via wires. In some aspects, the Ethernet switch (204) is also connected to a wireless transceiver (208), which includes an antenna (210) to send data to the manned offshore energy platform (103), as discussed above. The wireless transceiver (208) may also be part of a Supervisory Control And Data Acquisition (SCADA) system. A SCADA system is a large-scale, distributed measurement and control system that monitors and controls a site (in this case, one or more offshore energy platforms). Thus, the wireless transmission network may be used as a local backbone to send and receive measurement and operational signals that are part of normal operation of the unmanned offshore energy platform (103).

Because of the harsh nature of the environment around an offshore energy platform, the platform must be capable of being self-sufficient for extended periods of time. Accordingly, sensors (214), cameras (216), the gas chromatograph (218), and other monitoring devices that are part of the monitoring system (200) may be placed in protective housings to avoid damage. For example, a clear acrylic or Plexiglas housing may hold a camera or a sensor to protect it from water. Further, the power source (202) is configured to provide power to any device in the monitoring system (200) that does not have its own power supply. Thus, the processor (206), the Ethernet switch (204), the wireless access point (212), the wireless transceiver (208), or other elements that are part of the monitoring system (200) (not shown) may be powered by the power source (202).

The power source (202) may be one or more of any number of devices intended to provide power to devices that are part of the monitoring system (200). In an aspect of the invention, the power source (202) is a cluster of batteries. In other aspects of the invention, solar, wave, or wind power may be converted into electrical power and serve as the power source (202). Each of these power means may be used individually or in conjunction with another means of power. In other words, a battery power supply may be recharged by solar cells, or a battery or other uninterruptible power supply (UPS) may serve as a backup if power is generated via solar or wind energy. Fuel-powered generators or fuel cells may also be used as the power source (202). A UPS, such as a battery-powered UPS system or a rotary engine UPS, may be used if power is supplied via a generator.

The processor (206) coordinates all operations of the monitoring system (200). Accordingly, the processor (206) is connected, via the Ethernet switch (204), to the wireless access point (212) and the wireless transceiver (208). The processor may be any programmable device capable of performing the necessary functions associated with sensing and data transmission tasks on the unmanned offshore energy platform. For example, in an aspect of the invention, the processor (206) is a computer system containing computer-readable instructions for performing necessary sensing and data transmission tasks. In other aspects of the invention, the processor (206) may be an application-specific integrated circuit (ASIC) or other embedded design.

One or more cameras (216), sensors (214), a gas chromatograph (218), and other sensing devices obtain data corresponding to environmental conditions surrounding the unmanned off shore energy platform (101a, 101b, 101c in FIG. 1) and send the obtained data to the wireless access point (212). For example, in an aspect of the invention, a camera (216) detects a sheen of oil on water by recording a picture or a brief video of the surrounding water every hour, or at another predefined interval. A camera may be fixed or movable. In one embodiment of the invention, one camera (e.g., 216) is fixed, and another camera (not shown) is movable. Such cameras may be used individually, or combined with other cameras or one or more sensors (as discussed below) for greater measurement accuracy.

Continuing with FIG. 2, the sensor (214) is an automated device used to detect the presence of a particular analyte of interest. One example of a sensor is a photodiode, which detects visible light. In other aspects of the invention, the sensor is an infrared detector, which detects invisible (infrared) light. An analyte is a chemical substance that is the subject of chemical analysis. With reference to the invention, an analyte of interest may be, for example, a hydrocarbon such as crude oil or natural gas, or other substances associated with such hydrocarbons, such as hydrogen sulfide. Any number of sensors may be used individually or in conjunction with other monitoring devices. Further, while the camera (216), the sensor (214), and the gas chromatograph (218) are shown as connected to the wireless access point (212), in an aspect of the invention, these devices may be connected directly to the Ethernet switch (204) or to the processor (206). In other words, each monitoring device may connect by a wired connection.

Similarly, a gas chromatograph (218) detects the presence of a particular analyte of interest. Gas chromatography may be used at the unmanned offshore energy platform to detect particular hydrocarbons such as methane, ethane, or propane. This device performs processes that are part of a technique used to determine the presence of a particular analyte of interest. While such devices may be automated, they are typically run under human supervision. For the purposes of the invention, the gas chromatograph (218) be automated, or may be used only when a human is present on the unmanned offshore energy platform (101a, 101b, 101c in FIG. 1), or a combination of both.

In other aspects of the invention, mid-infrared (mid-IR) spectroscopy may be used to detect the presence of methane in certain applications. In an aspect of the invention, a device such as a mass spectrometer may use mid-IR spectroscopy to monitor the presence of carbon dioxide or another non-hydrocarbon. Further, the mass spectrometer may be used to detect the presence of a gaseous hydrocarbon, such as methane. As a non-hydrocarbon such as carbon dioxide is fundamentally distinct and distinguishable from a hydrocarbon, detecting a gas such as carbon dioxide enables a system operator to know the sensor is working. Further, the ratio of carbon dioxide to a gaseous hydrocarbon such as methane allows the operator to determine whether such a gaseous hydrocarbon is present in quantities characterized as above a predetermined maximum value. Other infrared ranges that may be used in certain applications include near-IR and far-IR.

Further, in an aspect of the invention, a sensor may detect a presence of gases such as hydrogen sulfide or carbon dioxide in a hydrocarbon. For example, in the case of hydrogen sulfide, a colorimetric method using a white tape impregnated with, for example, lead acetate, may be exposed to room air. In the presence of hydrogen sulfide, lead acetate undergoes an irreversible chemical reaction and forms lead sulfide. Thus, the presence of hydrogen sulfide may be determined based on the color change in the tape. The sensitivity of this method may be determined by time exposure of the tape to the surrounding environment. In other words, the longer a given section of tape is exposed to the room air, the smaller the amount of hydrogen sulfide may be detected in the air. Thus, in an aspect of the invention, an LED/photodiode pair may be used as a sensor (214) to detect the presence of hydrogen sulfide in a hydrocarbon (e.g., methane, crude oil).

After data is obtained by a monitoring device, the data may be processed by the processor (206). For example, the processor (206) may remove noise from the monitoring device, or the processor (206) may convert data to a format suited for wireless transmission. When the obtained data is suitable for transmission, the processor sends the data via the wireless transceiver (208) and the antenna (210) to the manned offshore energy platform (103 in FIG. 1).

Figure 3:
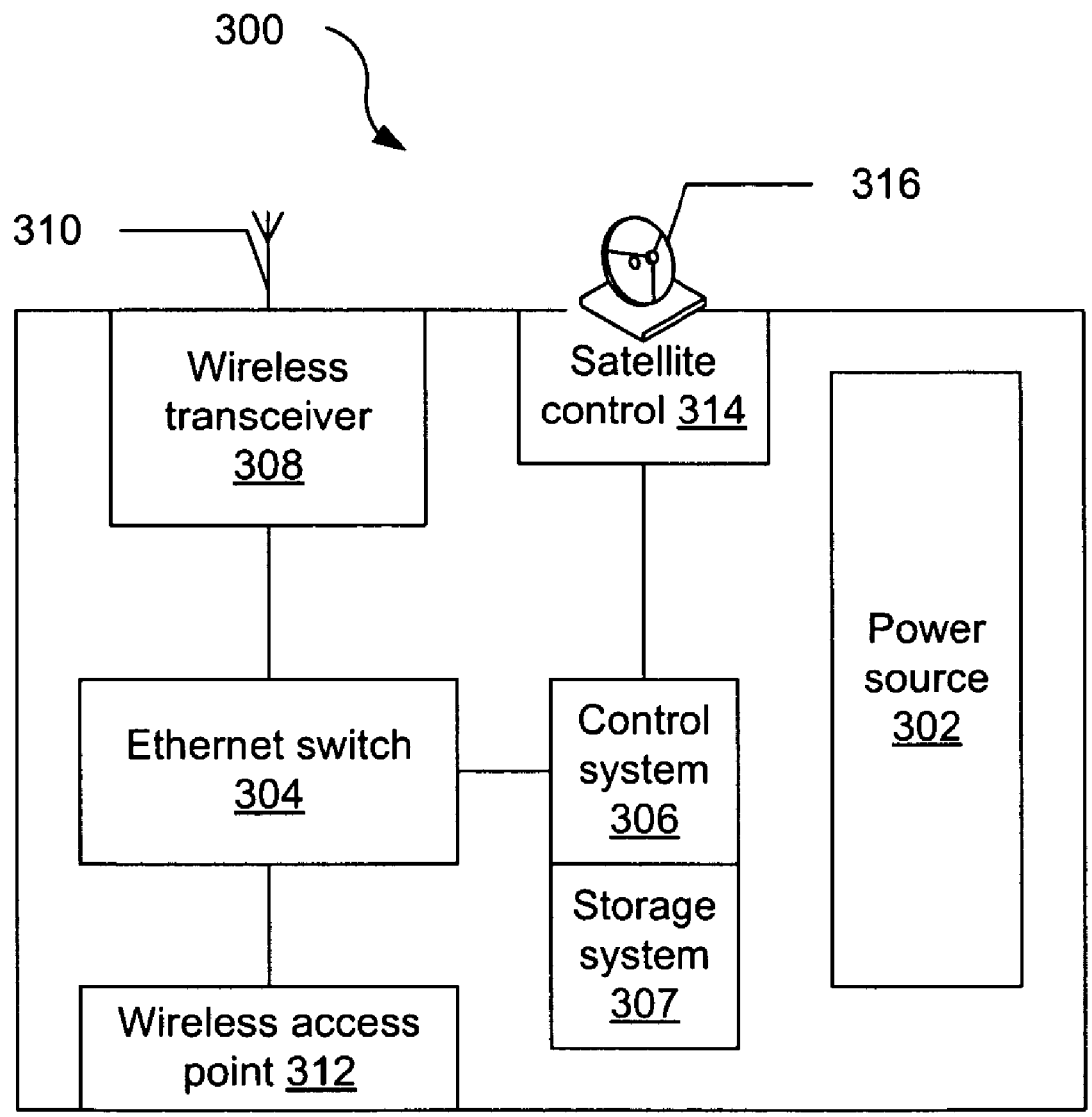
FIG. 3 shows a block diagram of a monitoring system of a manned platform in accordance with one or more aspects of the invention.

FIG. 3 shows a block diagram of a monitoring system (300) of a manned offshore energy platform in accordance with one or more aspects of the invention. In FIG. 3, the monitoring system (300) includes a power source (302). Power source (302) is similar to power source (202 in FIG. 2) discussed above. A control system (306) connects, either directly or indirectly, to an Ethernet switch (304). The control system (306) controls elements connected to the monitoring system (300), connected by the Ethernet switch (304). A monitoring system (300) of a manned offshore energy platform may function identically to a monitoring system (200) of an unmanned offshore energy platform. The monitoring system (300) of a manned offshore energy platform also contains additional functionality, described below.

The Ethernet switch (304) is connected to a wireless access point (312), which may be connected to one or more sensors (not shown) and/or cameras (not shown), and is also connected to a wireless transceiver (308), which transmits data via an antenna (310). The wireless transceiver (308) and the wireless access point (312) are similar to the wireless transceiver (208) and the wireless access point (212) as shown and described in relation to FIG. 2 discussed above. Thus, similar to the unmanned offshore energy platform, the Ethernet switch (304) provides an interface for the control system (306) to the wireless transceiver (308) and the wireless access point (312).

The control system (306) is also connected to a satellite control system (314), which controls a satellite antenna (316), and a storage system (307). The satellite control system (314) and the satellite antenna (316) communicate with the onshore office (105) via a satellite. The satellite may be, for example, satellite (107) of FIG. 1. The storage system (307) stores information, such as video data obtained from the monitoring systems of the unmanned offshore energy platforms. A monitoring system may be, for example, monitoring system (200) of FIG. 2. The storage system (307) may be any media device capable of storing electronic information, including magnetic storage devices such as a hard drive or a tape drive, an optical disk drive containing one or more optical disks, or a solid-state memory device, such as random access memory (RAM) or a flash memory device.

The control system (306) stores and interprets data received from the unmanned offshore energy platforms, and reports events to an operator located on the manned offshore energy platform or the onshore office. The manned offshore energy platform may be, for example, manned offshore energy platform (103) of FIG. 1. The onshore office may be, for example, onshore office (105) of FIG. 1. In the process of interpreting data received from the unmanned offshore energy platforms, the control system (306) may request more information from the monitoring system of an unmanned offshore energy platform or send a notification to an operator or to an onshore office. To request more information, the control system (306) asserts one or more control signals responsive to received video signals and sensor measurements from an unmanned platform. The unmanned platform may be, for example, unmanned offshore energy platform (101a) of FIG. 1. Control signals indicate a hydrocarbon detected above a predetermined threshold value, and are used to adjust cameras and sensors at the unmanned offshore energy platform. In this manner, the control system (306) may obtain additional data at the unmanned offshore energy platform based on a detected hydrocarbon. A notification is a user-interpretable message sent to inform an operator regarding a status of the unmanned offshore energy platform that may require human intervention. The control system (306) may request information from an operator responsive to information received and interpreted by the control system (306).

One or more aspects of the invention use error detection schemes to verify the result of a particular sensor or camera. Further, various methods of signal processing may also be used in an aspect of the invention. Thus, the control system (306) of a manned offshore energy platform may further include an error detection system (not shown). In an aspect of the invention, the error detection system may be separate from or part of the control system (306). For example, the control system (306) may contain logic for multiple cameras, sensors, or other devices to be used concurrently. Alternatively, the control system (306) may contain logic to combine measurements from multiple sensors. Such concurrent measurement or combination of measurements allows greater confidence in the measurements recorded. In one embodiment of the invention, the processor (206) of FIG. 2 handles all signal processing requirements for the monitoring system. In other aspects of the invention, the control system (306) of a monitoring system (300) of a manned offshore energy platform (discussed below) performs necessary signal processing functions and instructs the processor accordingly. In other aspects of the invention, instructions may be sent from the onshore office to a monitoring system (300) of a manned offshore energy platform, and then sent to the processor (206).

Figure 4A:
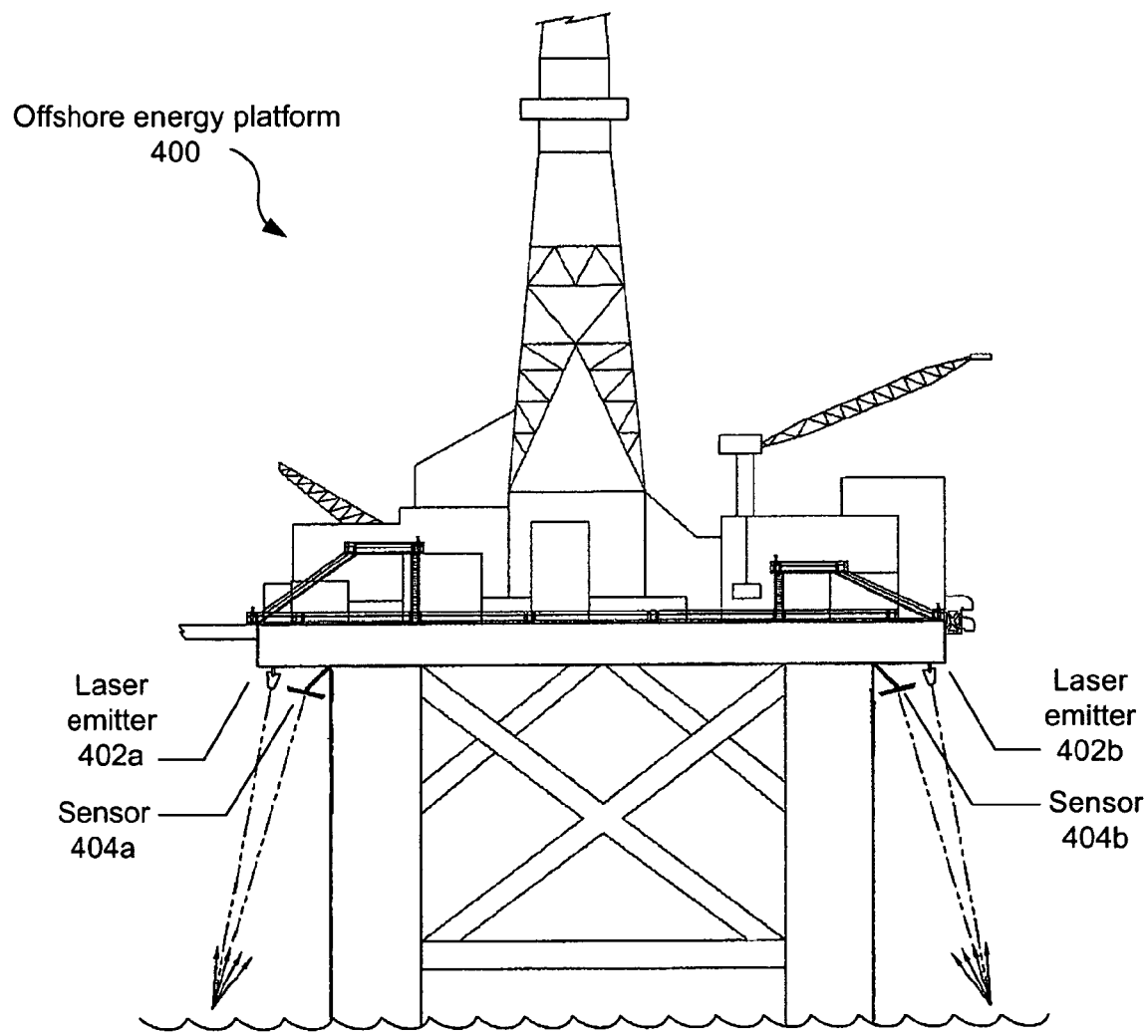
FIG. 4A shows a side view of an unmanned platform in accordance with one or more aspects of the invention.
Figure 4B:
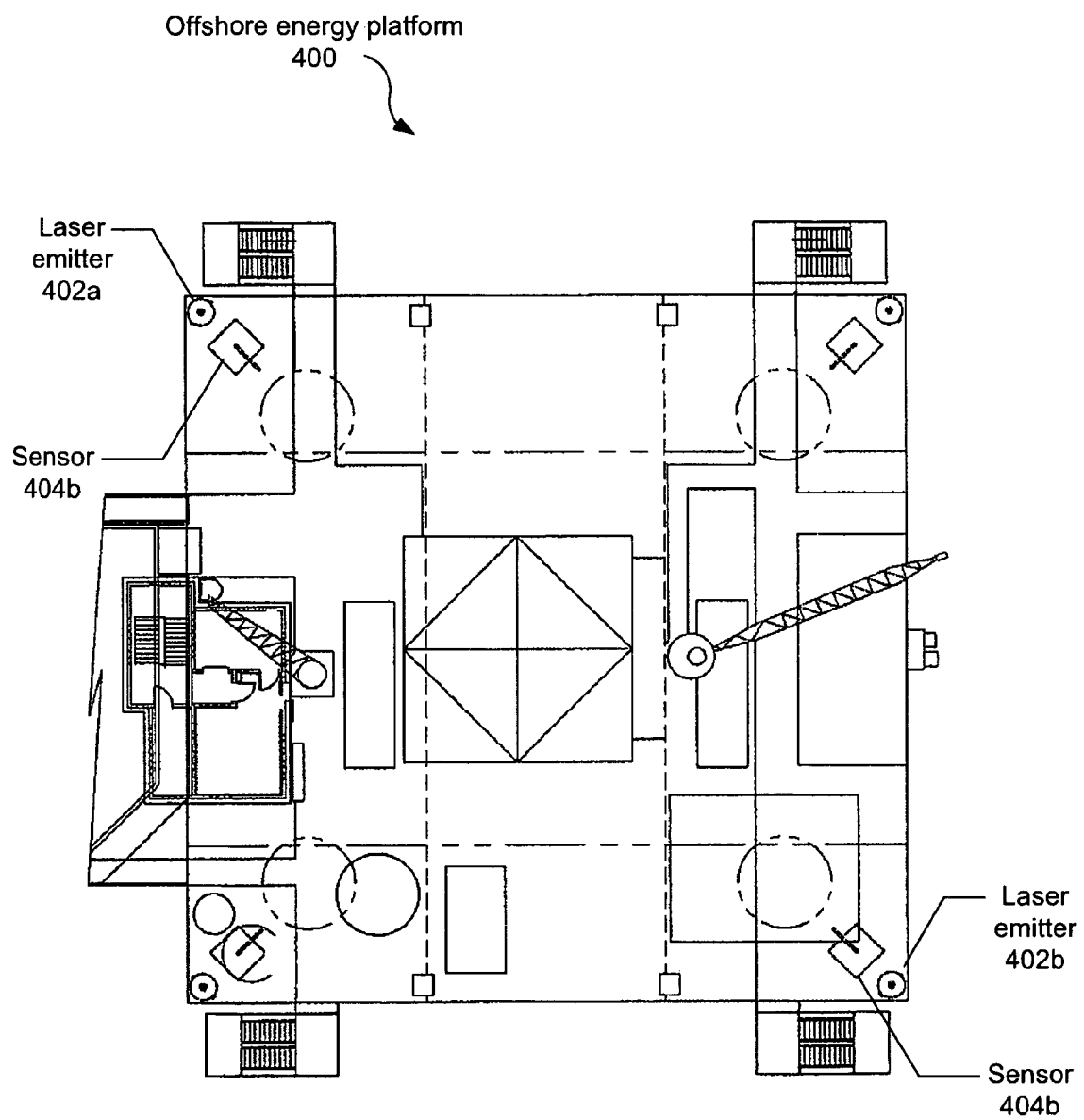
FIG. 4B shows a top view of an unmanned platform in accordance with one or more aspects of the invention.

FIG. 4A shows a side view of an exemplary offshore energy platform (400) in accordance with one or more aspects of the invention. FIG. 4B shows a top view of the offshore energy platform (400) shown in FIG. 4A. As seen with respect to FIGS. 4A and 4B, the offshore energy platform (400) includes laser emitters (402a, 402b), each with corresponding sensors (404a, 404b), such as infrared detectors. In an aspect of the invention, laser induced fluorescence (LIF) may be used to detect a presence of a hydrocarbon in or on water. In this embodiment, a laser is focused on the water in the area of the sensor to excite molecules that are present. The excitation of these molecules results in optical emission from the molecules, which can be read by the sensor (404a, 404b). This data is then sent to a wireless access point on an unmanned platform, and in turn, to a manned offshore energy platform, for example, manned offshore energy platform (103) of FIG. 1.

Figure 5A:
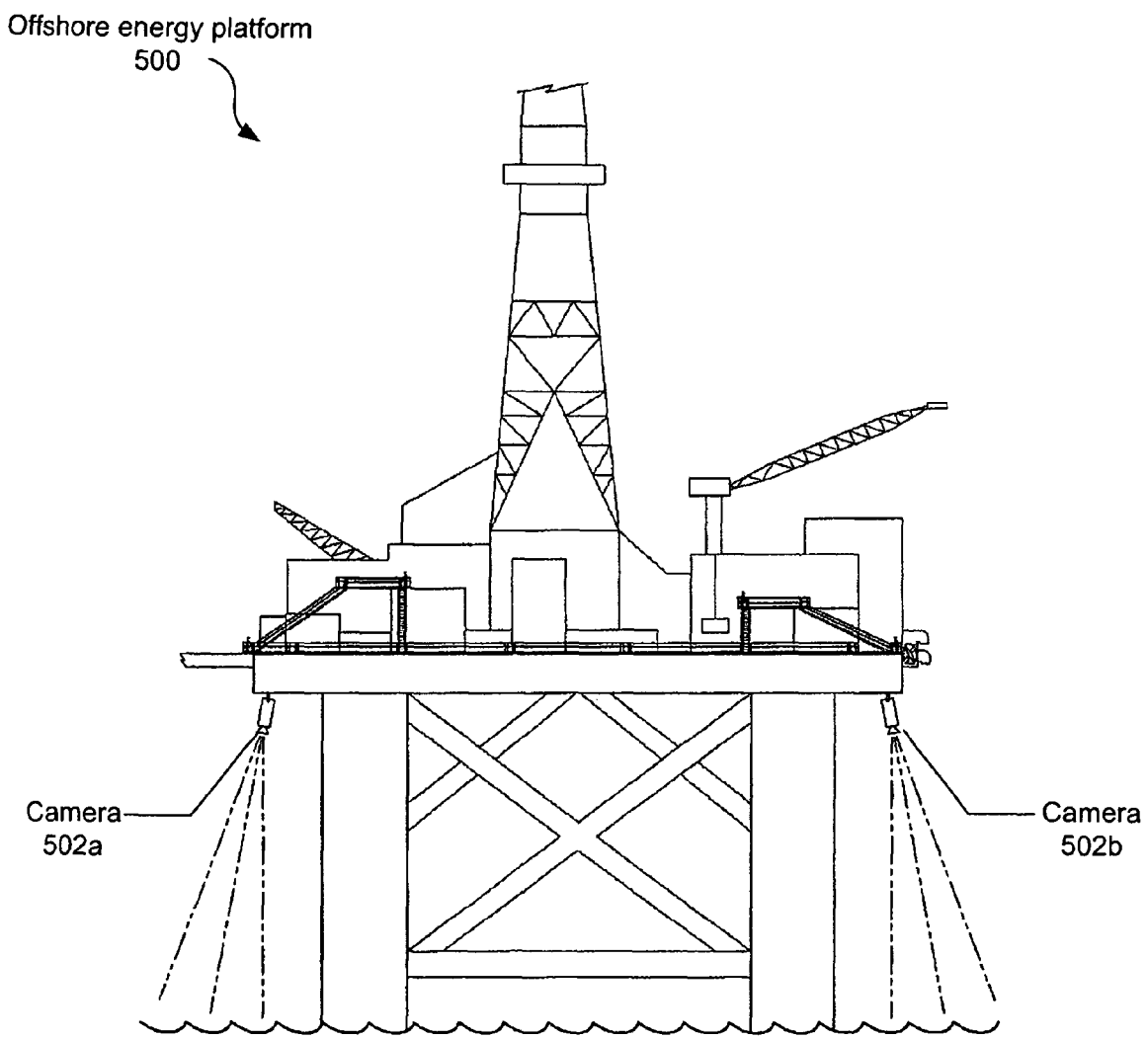
FIG. 5A shows a side view of an unmanned platform in accordance with one or more aspects of the invention.
Figure 5B:
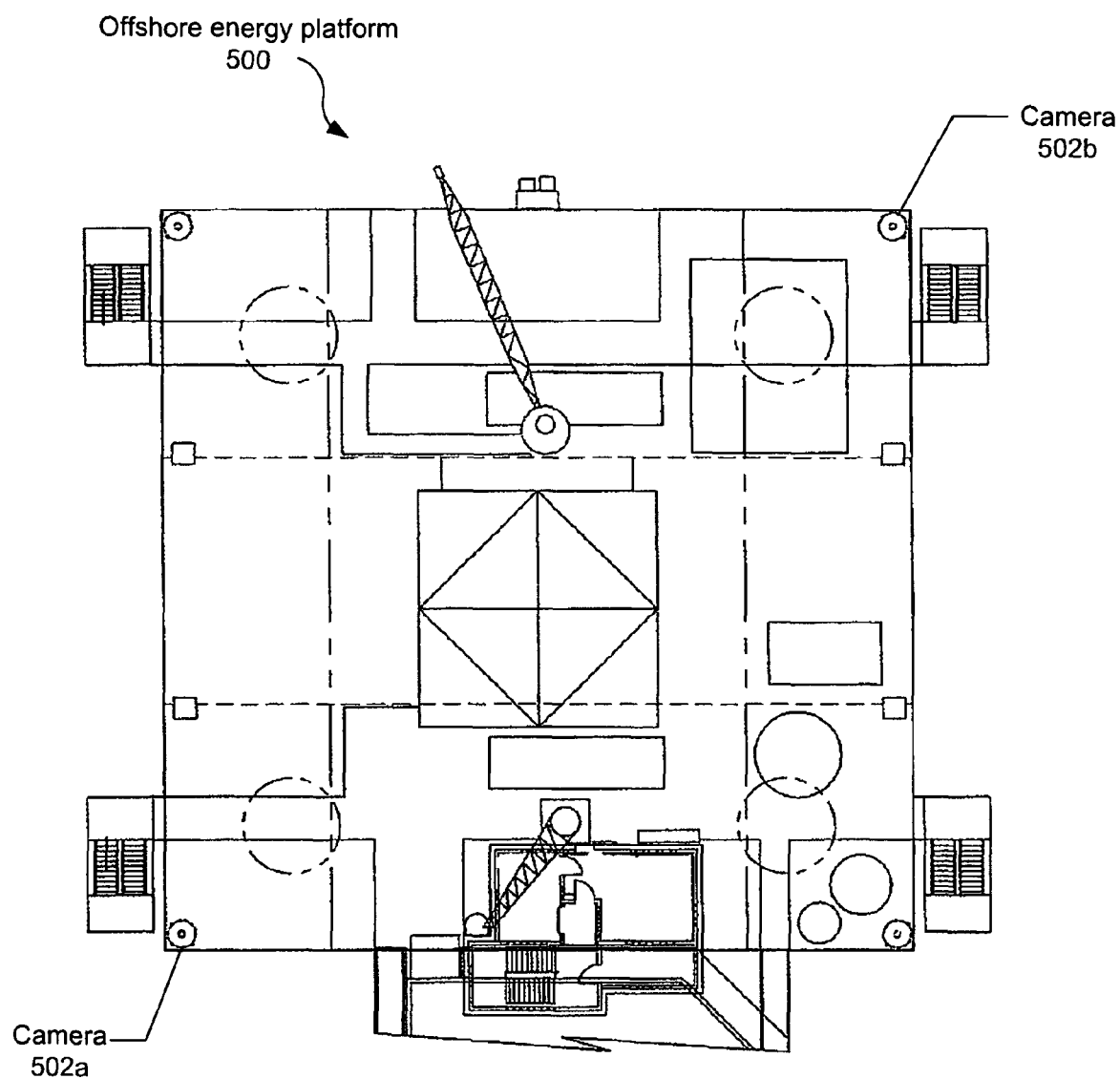
FIG. 5B shows a top view of an unmanned platform in accordance with one or more aspects of the invention.

FIG. 5A shows a side view of an exemplary offshore energy platform (500) in accordance with one or more aspects of the invention. FIG. 5B shows a top view of the offshore energy platform (500) shown in FIG. 5A. As seen with respect to FIGS. 5A and 5B, the offshore energy platform (500) includes a plurality of cameras (502a, 502b). In an aspect of the invention, a camera (502a, 502b) may be used to detect a presence of a hydrocarbon in or on water, for example, by detecting a sheen of oil on water. Such a camera (502a, 502b, 502c, 502d) may be used singly, or combined with other cameras or sensors (as discussed above) for greater measurement accuracy.

For example, as crude oil typically produces both a visible sheen signature and a gas signature. A control system may trigger an alert if more than one type of sensor (e.g., a camera and a laser/IR sensor system) indicates the presence of such a hydrocarbon. The control system may instruct the satellite control system to send an alert to an onshore office. An operator, either at the onshore office or at the manned offshore energy platform, may respond to an alert by scheduling a physical inspection of the platform where the hydrocarbon was detected. Sensors near a camera may be activated by the control system in response to a camera that first detects hydrocarbons. When the control system activates these sensors, the control system detects the spread of the hydrocarbon. Similarly, as a signal detected from a gas tends to be qualitative in nature, the indication of a gas by one sensor may result in priority being given to other sensors in proximity of the first sensor that also indicate the presence of a gas. In other words, the other sensors may be adjusted dependent on one or more control signals sent by the control system. In this manner, the spread of the gas would be more likely to be detected, and an appropriate notification could be generated.

In an aspect of the invention, the laser emitters (402a, 402b) and sensors (404a, 404b) shown in FIGS. 4A and 4B are located at corners of an offshore energy platform (400), facing downward (i.e., toward water). Similarly, the cameras (502a, 502b) are located at corners of an offshore energy platform (500), facing downward (i.e., toward water). Numerous other numbers of and configurations of monitoring devices are possible that do not depart from the scope of the invention.

For example, multiple monitoring devices may be placed at a similar location on an offshore energy platform. Multiple locations other than those shown in FIGS. 4A-5B may also be used. For example, monitoring devices may be placed along the perimeter of an offshore energy platform, near the center of an offshore energy platform, or along any supporting structures of an offshore energy platform. Further, monitoring devices may be placed near water or possible sources of hydrocarbons, or far from these locations, or any distance in between. Similarly, while these devices may be directed toward water as shown in FIGS. 4A-5B, they may also be directed toward other features of interest, such as well heads and docking areas on the platform.

Figure 6:
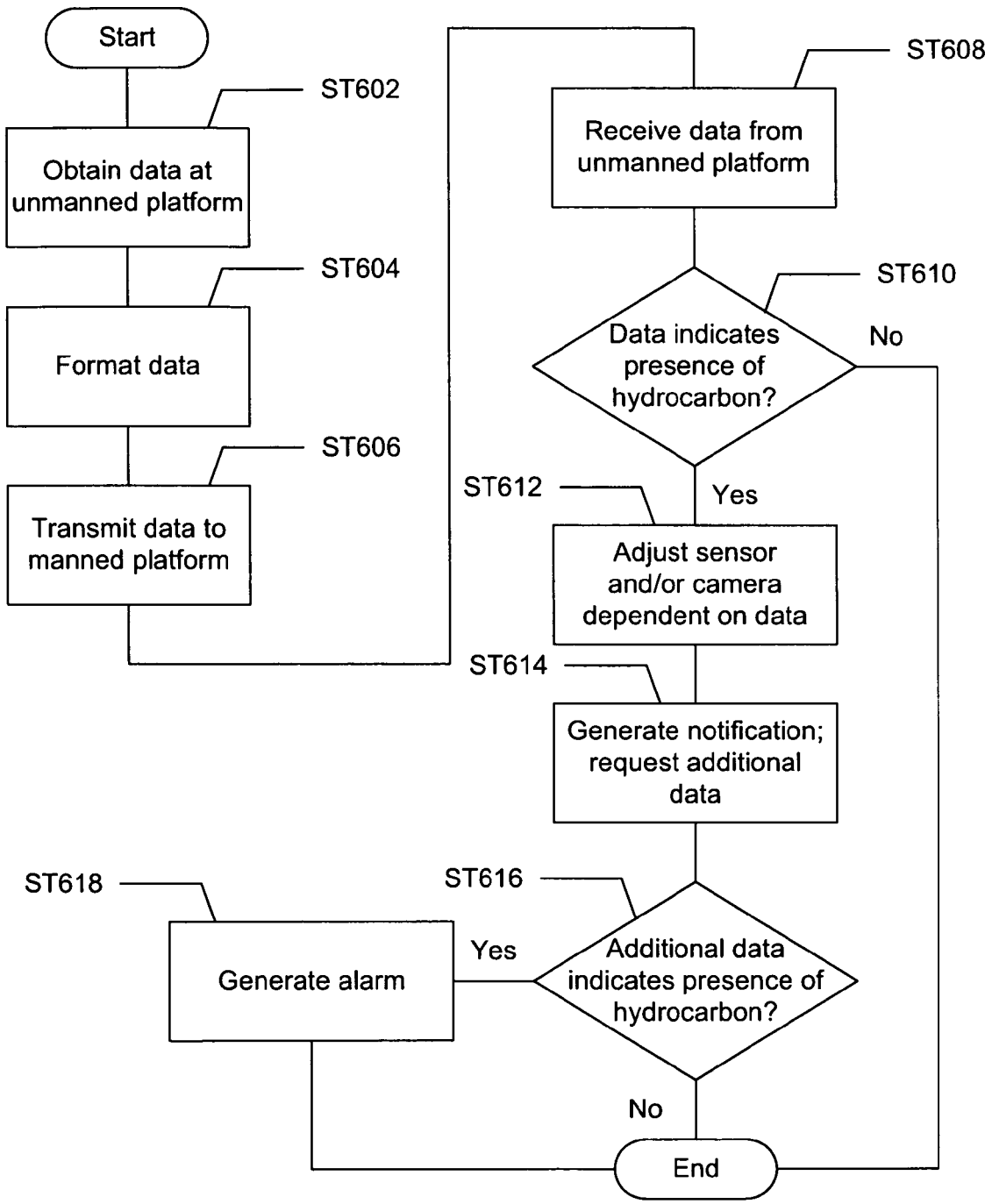
FIG. 6 shows a flowchart for transferring data in accordance with one or more aspects of the invention.

FIG. 6 shows a flowchart of steps performed by an offshore system in accordance with one or more aspects of the invention. The monitoring system, part of the wireless system, transfers data from an unmanned offshore energy platform to a manned offshore energy platform in accordance with one or more aspects of the invention described above. Initially, the monitoring system obtains data at an unmanned offshore energy platform (Step 602). For example, the monitoring system may obtain data via at least one monitoring device. The monitoring device may be, for example, a camera, a laser sensor, a gas chromatograph, a computer system, or a voice over internet protocol telephone as described and shown above. The monitoring system formats the data. For example, the processor on the unmanned offshore energy platform, performs operations to convert data into formatted data (Step 604). Formatted data is data suited for transmission to the manned offshore energy platform. The monitoring system transmits the formatted data to the manned offshore energy platform (Step 606). The manned offshore energy platform then receives the formatted data (Step 608). If the formatted data does not indicate the presence of a problem such as a (leaked) hydrocarbon, the process ends. However, if control system determines that the formatted data indicates the presence of a hydrocarbon (Step 610), sensor(s), the control system may adjust the monitoring devices (Step 612). The adjustment of one of these devices may enhance the likelihood of receiving data indicating the presence of the hydrocarbon. The determination of the presence of a particular hydrocarbon may be based on, for example, a reading of data above a predetermined threshold value for that hydrocarbon.

In Step 612, the monitoring device(s) is adjusted dependent on the type of monitoring device. For example, a camera may be panned to a different direction corresponding to a detected hydrocarbon if the detected hydrocarbon is detected in a portion of the field of view of the camera. Alternatively, if a hydrocarbon is detected in a portion of the field of view of a camera, another camera may be panned in the direction of the field of view of the first camera to confirm the detection. Similarly, if a sensor detects the presence of a hydrocarbon, the sensitivity of that sensor or other sensors in the vicinity of that sensor may be adjusted to better detect the spread of the hydrocarbon.

At this point, a notification may be sent to the onshore office, and a request for additional data may be made, for example, by the control system of the manned offshore energy platform (Step 614). If additional data is received, the control system may determine whether the additional data indicates the presence of a hydrocarbon (Step 616). After any appropriate signal processing, if the additional data also indicates the presence of a hydrocarbon, the control system may generate an alert (Step 618). This process may include, for example, the manned offshore energy platform sending an alert to an onshore office, for example, onshore office (105) of FIG. 1. An alert is a message sent to an operator indicating the confirmation of the presence of a hydrocarbon, of another analyte of interest, or of other unaccounted-for activity. In other words, more than one monitoring device has detected a particular environmental condition that may require human intervention. Based on the alert, an operator may perform a number of actions, including, but not limited to, scheduling a visit to the unmanned offshore energy platform responsible for the alert and requesting maintenance to be performed on the unmanned offshore energy platform responsible for the alert.

Although aspects of the invention have been described showing a flow of data between an unmanned offshore energy platform to a manned offshore energy platform and additionally from a manned offshore energy platform to an onshore office, other data paths are possible that do not depart from the scope of the invention. For example, if an unmanned offshore energy platform normally sends data to a particular manned offshore energy platform but the manned offshore energy platform is unavailable, the unmanned offshore energy platform may instead send the data to another manned offshore energy platform in transmission range of the unmanned offshore energy platform, or an onshore office, if an onshore office is within transmission range of the unmanned offshore energy platform. Alternatively, the unmanned offshore energy platform may send the data to one or more other unmanned offshore energy platforms to relay the data to a manned offshore energy platform or an onshore office.

Similarly, a manned offshore energy platform may use another manned offshore energy platform, an unmanned offshore energy platform, or an onshore office other than an intended onshore office to relay information to a desired location, Thus, even when one expected link in a data path from an unmanned offshore energy platform to a manned offshore energy platform to an onshore office (or vice-versa) is unavailable, alternate routes may be found to complete the data path. Further, when such an alternate data path is created, an additional alarm may be sent to a manned offshore energy platform or an onshore office in the data path to indicate that a link in the original data path is unavailable.

Although numerous applications and types of sensors have been discussed with respect to aspects of the invention, other sensors may be used in accordance with one or more aspects of the invention. Such sensors may be based on any signal necessary to detect a particular analyte deemed to be of interest. Typical sensor ranges include, but are not limited to, visible light, laser radiation using visible light or infrared (IR) light, X-ray radiation, gamma ray radiation, microwave radiation, ultraviolet radiation, and ultrasonic pulses.

One or more aspects of the invention may concentrate the analyte of interest through various methods to improve the quality of the signal corresponding to the analyte of interest. In other words, data may be "stacked" over time to clean the signal or to improve the signal-to-noise ratio of the signal corresponding to the analyte of interest. For example, in an aspect of the invention, measurements to detect the presence of methane gas (e.g., with a gas chromatograph, described above) may be taken at a sample rate of 10 measurements per second. Stacking includes the use of statistical methods to combine or average the samples to improve the signal-to-noise ratio of the measured value of the methane. In other aspects of the invention, methane may be trapped (e.g., cryogenically) in a sample, which allows the methane to be concentrated and the ratio of methane to be calculated in a batch analysis.

Figure 7:
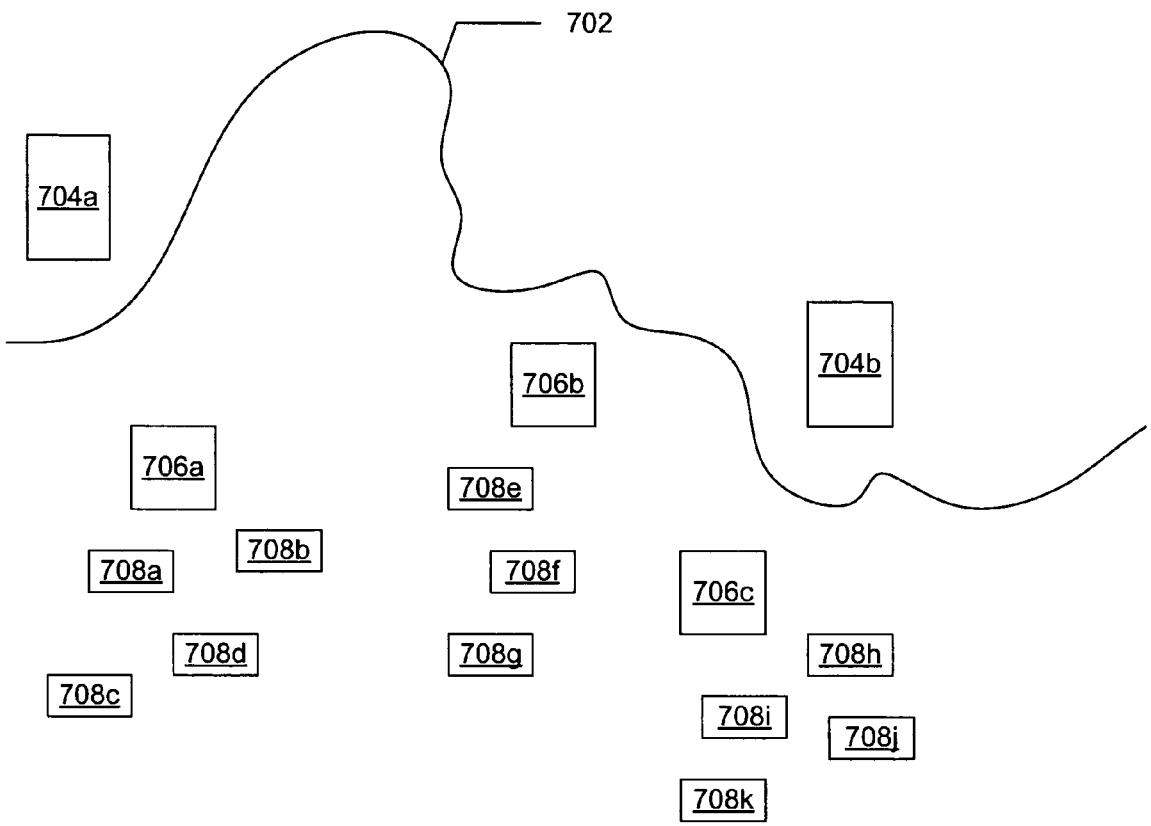
FIG. 7 shows a system of offshore energy platforms and onshore offices in accordance with one or more aspects of the invention.

An example system operating in accordance with one or more aspects of the invention will now be described with reference to the above descriptions and FIG. 7. FIG. 7 shows a first onshore office (704a) capable of communication with a first manned offshore energy platform (706a). The first manned offshore energy platform (706a) can communicate with a first group of unmanned offshore energy platforms (708a, 708b, 708c, 708d). Additionally, a second onshore office (704b) is capable of communicating with a second manned offshore energy platform (706b) and a third manned offshore energy platform (706c). The second manned offshore energy platform (706b) can communicate with a second group of unmanned offshore energy platforms (708e, 708f 708g), and the third manned offshore energy platform (706c) can communicate with a third group of unmanned offshore energy platforms (708h, 708i 708j, 708k).

In FIG. 7, an unmanned offshore energy platform (e.g., unmanned offshore energy platform 708b) detects a presence of a hydrocarbon at the unmanned offshore energy platform (708b). A typical method for transferring data in accordance with one or more aspects of the invention involves the unmanned offshore energy platform (708b) sending data to the first manned offshore energy platform (706a), which sends a control signal responsive to the data if the data indicates that a hydrocarbon is present above a predetermined threshold. However, in this case, part of the wireless communication network (e.g., a wireless transceiver (not shown) or an antenna (not shown)) on the first manned offshore energy platform (706a) is not functioning properly. Accordingly, the first manned offshore energy platform (706a) cannot receive data from the unmanned offshore energy platform (708b).

In this case, because the first onshore office (704a) is out of transmission range of any unmanned offshore energy platform normally capable of communicating with the first manned offshore energy platform (706a) (including the unmanned offshore energy platform (708b)), the unmanned offshore energy platform (708b) seeks another route to send the data. In this case, a second unmanned offshore energy platform (708e) is close enough to the first unmanned offshore energy platform (708b) to allow the first unmanned offshore energy platform (708b) to send the data to the second unmanned offshore energy platform (708e). The second unmanned offshore energy platform (708e) then forwards this data (on behalf of the first unmanned offshore energy platform (708b)) to the second manned offshore energy platform (706b).

After the second manned offshore energy platform (706b) receives the data from the first unmanned offshore energy platform (708b), via the second unmanned offshore energy platform (708e), the second manned offshore energy platform (706b) sends a control signal responsive to the data indicating that a hydrocarbon is detected above a predetermined threshold. This control signal is sent to the first unmanned offshore energy platform (708b) via the second unmanned offshore energy platform (708e). Concurrently, the second manned offshore energy platform (706b) sends a notification regarding the data indicating the presence of a hydrocarbon to the second onshore office (704b). Additionally, the second manned offshore energy platform (706b) sends a notification alerting a computer system (not shown) or a human operator (not shown) on the second onshore office (704b) that the second manned offshore energy platform (706b) received data from the first unmanned offshore energy platform (708b) via the second unmanned offshore energy platform (708e). In response to this notification, the computer system or human operator may schedule a repair visit to the first manned offshore energy platform (706a) to determine the cause of the loss of communication at the first manned offshore energy platform (706a).

In aspects of the invention, the first unmanned offshore energy platform (708b) adjusts monitoring devices (not shown) on the first unmanned offshore energy platform (708b) in response to the control signal in an attempt to obtain additional data. When one of the monitoring devices obtains additional data indicating the presence of a hydrocarbon, the first unmanned offshore energy platform (708b) sends this data, via the second unmanned offshore energy platform (708e), to the second manned offshore energy platform (706b). The second manned offshore energy platform (706b) wirelessly receives the additional data, and interprets this data as confirming the presence of a hydrocarbon at the first manned offshore energy platform (706a). Accordingly, the second manned offshore energy platform (706b) sends an alert to the second the second onshore office (704b). A computer system or a human operator then determines a course of action for the first unmanned offshore energy platform (708b). For example, a computer system may schedule a visit to the first unmanned offshore energy platform (708b). Alternatively, depending at least in part on the severity of the data confirming the presence of a hydrocarbon, a human operator may order a shutdown of the first unmanned offshore energy platform (708b).

While aspects of the invention have been discussed with respect to detecting the presence of hydrocarbons on an unmanned offshore energy platform, the invention is not limited thereto. For example, other chemicals may be of interest in certain applications. Further, in an aspect of the invention, the detection of objects (boats, people, etc.) may be performed at the site of the unmanned offshore energy platform. As it is important to monitor unauthorized access to unmanned offshore energy platforms, sensors detecting such unauthorized activity may be used. For example, in addition to closed-circuit television cameras, motion detectors, laser/sensor systems, and thermal image sensors may be used to detect the presence of unauthorized humans or watercraft present at an unmanned offshore energy platform or to check for storm damage.

Figure 8:
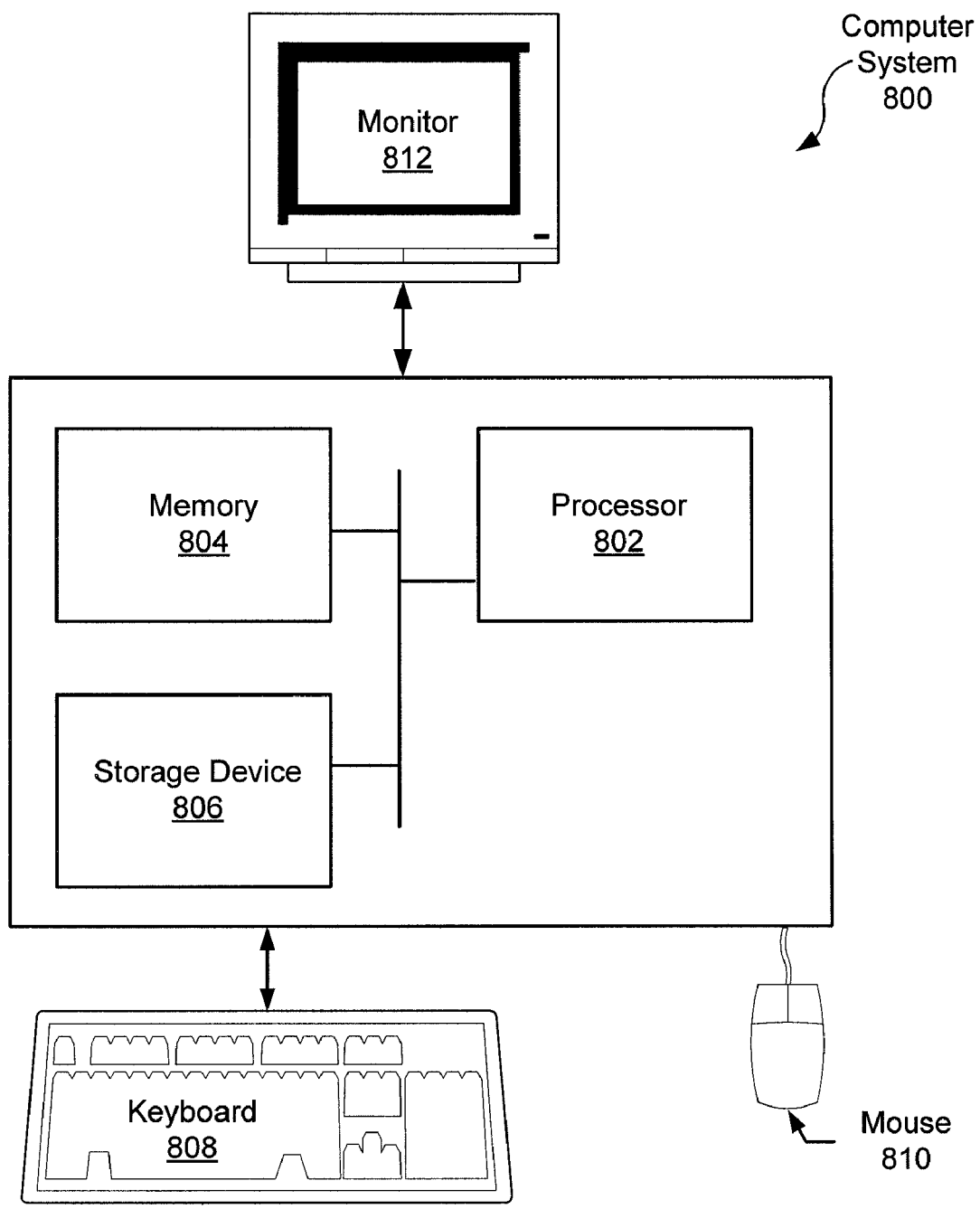
FIG. 8 shows a computer system in accordance with aspects of the invention.

The present invention may be implemented on virtually any type of computer system, regardless of the platform being used. For example, as shown in FIG. 8, a networked computer system (800) may be used as a processor (206) of FIG. 2 or a control system (306) of FIG. 3. The networked computer system (800) includes a processor (802), associated memory (804), a storage device (806), and numerous other elements and functionalities typical of a computer (not shown). The networked computer (800) may also include input means, such as a keyboard (808) and a mouse (810), and output means, such as a monitor (812). The networked computer system (800) is connected to a local area network (LAN) or a wide area network (e.g., the Internet) (not shown) via a network interface connection (not shown). Those skilled in the art will appreciate that these input and output means may take other forms.

Further, one or more elements of the aforementioned computer system (800) may be located at a remote location and connected to the other elements over a network. Further, the present invention may be implemented on a distributed system having a plurality of nodes, where each portion of the invention may be located on a different node within the distributed system. Further, software instructions to perform aspects of the invention may be stored on a computer readable medium such as a compact disk (CD), a diskette, a tape, a file, or any other computer readable storage device.

Advantages of the invention may include one or more of the following. In an aspect of the invention, unmanned offshore energy platforms may be monitored remotely, thus obviating the need to physically visit and inspect a platform.

In an aspect of the invention, a pollution incident at an unmanned offshore energy platform may be detected immediately rather than up to a time based on a pollution flight frequency of the platform. Thus, in an aspect of the invention, the amount of spillage due to a pollution incident at an unmanned offshore energy platform may be reduced. Accordingly, one or more aspects of the invention may result in a cost savings due to reduced environmental clean-up and fines.

In an aspect of the invention, compounds typically associated with hydrocarbons may be monitored at an unmanned offshore energy platform, and if necessary reported to a manned offshore energy platform or to an onshore office for review. Accordingly, in an aspect of the invention, countermeasures to protect against the release of compounds associated with hydrocarbons from an unmanned offshore energy platform may be taken.

In an aspect of the invention, multiple detection methods may be used to detect the presence of a hydrocarbon, a compound associated with a hydrocarbon, or some other abnormal activity at an unmanned offshore energy platform. Further, in an aspect of the invention, the multiple detection methods may be used in conjunction with each other to provide greater confidence in the results obtained.

While the invention has been described with respect to a limited number of aspects, those skilled in the art, having benefit of this disclosure, will appreciate that other aspects can be devised which do not depart from the scope of the invention as disclosed herein. Accordingly, the scope of the invention should be limited only by the attached claims.

What is claimed is:

1. A method for transferring data from an unmanned offshore energy platform to a manned offshore energy platform, comprising:
   monitoring, using a first monitoring device, for a presence of hydrocarbons in water surrounding the unmanned offshore energy platform, wherein the first monitoring device is configured to detect the presence of hydrocarbons in the water surrounding the unmanned offshore energy platform;
   detecting, using the first monitoring device, the presence of hydrocarbons in a location in the water surrounding the unmanned offshore energy platform;
   obtaining first data associated with the presence of hydrocarbons in the location in the water surrounding the unmanned offshore energy platform from the first monitoring device;
   formatting the first data for transmission;
   wirelessly transmitting the first data from the unmanned offshore energy platform to a control system on the manned offshore energy platform;
   determining, by the control system, that the first data indicates the presence of hydrocarbons in the water surrounding the offshore energy platform;
   adjusting, in response to determining that the first data indicates the presence of hydrocarbons in the location in the water surrounding the offshore energy platform, using the control system, a position of a second monitoring device on the unmanned offshore energy platform, wherein the second monitoring device is configured to measure an amount of hydrocarbons in the location in the water surrounding the unmanned offshore energy platform;
   obtaining, using the second monitoring device, second data corresponding to the amount of hydrocarbons in the location in the water surrounding the unmanned offshore energy platform;
   formatting the second data for transmission;
   wirelessly transmitting the second data from the unmanned offshore energy platform to the control system on the manned offshore energy platform; and
   determining, based on the second data collected from the second monitoring device, that the amount of hydrocarbons in the location in the water surrounding the unmanned offshore energy platform exceeds a predetermined threshold value.

2. The method of claim 1, wherein the first monitoring device includes at least one selected from a group consisting of a camera, a sensor, a computer system, a gas chromatograph, a laser emitter, and a Voice Over Internet Protocol telephone.

3. The method of claim 1, further comprising:
   generating a notification on the manned offshore energy platform when the second data exceeds the predetermined threshold value.

4. The method of claim 3, further comprising:
   sending an alert to an onshore office when the second data exceeds the predetermined threshold value.

5. The method of claim 1, further comprising:
   receiving the first and second data at the manned offshore energy platform via a first antenna, wherein the step of wirelessly transmitting operates via a second antenna.

6. The method of claim 5, wherein the second antenna is an omnidirectional antenna.

7. The method of claim 5, wherein the first antenna is a directional antenna.

8. The method of claim 1, wherein when the manned offshore energy platform is unavailable, wirelessly transmitting the first and second data from the unmanned offshore energy platform to one selected from a group consisting of another manned offshore energy platform, another unmanned offshore energy platform, and an onshore office.

9. The method of claim 1, wherein the first data comprises at least one of a group consisting of monitoring data for programmable logic controls, video data from the video camera, Voice Over Internet Protocol communication data, and sensor data.

10. The method of claim 1, wherein hydrocarbons in the water surrounding the unmanned offshore energy platform comprises at least one selected from a group consisting of leakage of a hydrocarbon and leakage of a gas associated with hydrocarbons.

11. The method of claim 1, wherein the second data comprises a plurality of samples collected at a sample rate, wherein the plurality of samples are statistically averaged, based on the sample rate, to improve a signal-to-noise ratio of the second data and increase an accuracy of the amount of hydrocarbons measured by the second monitoring device.

12. A method of evaluating, by a control system, data associated with an unmanned offshore energy platform, comprising:
   receiving, by the control system formatted first data from the unmanned offshore energy platform, wherein the formatted first data is collected by a first monitoring device on the unmanned offshore energy platform and comprises at least one of group consisting of a video signal and a sensor measurement, and wherein the formatted first data is associated with a presence of hydrocarbons in a location in water surrounding the unmanned offshore energy platform;
   determining, by the control system, based on the formatted first data, the presence of hydrocarbons in the location in the water surrounding the unmanned offshore energy platform based on an evaluation of the formatted first data; and
   sending, by the control system, to a second monitoring device in response to the evaluation of the formatted first data, a control signal to adjust a position of a second monitoring device to measure an amount of hydrocarbons in the location in the water surrounding the unmanned offshore energy platform.

13. The method of claim 12, further comprising:
   receiving formatted second data, collected by the second monitoring device, from the unmanned offshore energy platform in response to the control signal, wherein the formatted second data measures the amount of hydrocarbons in the location in the water surrounding the unmanned offshore energy platform; and
   determining, using the formatted second data, that the amount of hydrocarbons in the water surrounding the unmanned offshore energy platform exceeds a predetermined threshold value.

14. The method of claim 12, wherein the second monitoring device measures the amount of hydrocarbons in the location in the water surrounding the unmanned offshore energy platform by inducing fluorescence of oil on the water.

15. The method of claim 12, wherein the second monitoring device measures the amount of hydrocarbons in the location in the water surrounding the unmanned offshore energy platform by using gas chromatography to detect a gas in the water.

16. The method of claim 12, further comprising:
obtaining the formatted first data by stacking a plurality of measurements over time.

17. The method of claim 16, wherein obtaining the formatted first data comprises concentrating an analyte of interest.

18. The method of claim 12, wherein the formatted first data comprises a plurality of samples collected at a sample rate, wherein the plurality of samples are statistically averaged, based on the sample rate, to improve a signal-to-noise ratio of the formatted first data and increase an accuracy of detecting the presence of hydrocarbons measured by the first monitoring device.

19. A system for evaluating data, comprising:
an unmanned offshore energy platform, comprising:
a first monitoring device configured to:
detect a presence of hydrocarbons in a location in water surrounding the unmanned offshore energy platform; and
generate first data associated with the presence of hydrocarbons in the location in the water surrounding the unmanned offshore energy platform;
a second monitoring device configured to:
receive a control signal, sent by a control system on a manned offshore energy platform, used to adjust a position of the second monitoring device to measure an amount of hydrocarbons in the location in the water surrounding the unmanned offshore energy platform;
measure the amount of hydrocarbons in the location in the water surrounding the unmanned offshore energy platform; and
generate the second data associated with the amount of hydrocarbons in the location in the water surrounding the unmanned offshore energy platform;
a first local wireless access point wirelessly connected to the first and second monitoring devices, and configured to receive the first and second data from the first and second monitoring device;
a first switch connected to the first local wireless access point, and configured to format the first and second data from the first local wireless access point to form formatted first and second data; and
a first wireless transceiver operatively coupled to the first switch, wherein the first wireless transceiver comprises a first antenna configured to:
send the formatted first and second data for evaluation by the control system in determining whether the amount of hydrocarbons present in the water surrounding the unmanned offshore energy platform exceeds a predetermined threshold value; and
receive, during the evaluation, the control signal from the control system, wherein the control signal is sent to the first local wireless access point to adjust the second monitoring device.

20. The system of claim 19, further comprising an onshore office configured to receive at least one of a group consisting of a notification and an alert.

21. The system of claim 19, further comprising:
a manned offshore energy platform, comprising:
a second wireless transceiver configured to receive the formatted first and second data from the first wireless transceiver;
a second switch connected to the second wireless transceiver and configured to reformat the formatted first and second data from the second wireless transceiver to create reformatted first and second data;
wherein the control system is executing on a processor and configured to:
receive the reformatted first and second data from the second switch;
perform the evaluation; and
send the control signal to adjust the second monitoring device;
a storage system controlled by the control system and configured to store the reformatted first and second data; and
a wireless system configured to send a notification to an onshore office dependent on a notification signal from the control system.

22. The system of claim 21, wherein performing the evaluation by the control system comprises:
receiving the reformatted first data from the second switch;
determining that the formatted first data indicates the presence of hydrocarbons in the location in the water surrounding the offshore energy platform;
generating a control signal to adjust the second monitoring device to measure an amount of hydrocarbons in the location in the water surrounding the unmanned offshore energy platform;
sending the control signal to the second wireless transceiver, wherein the second wireless transceiver is further configured to send the control signal to the first wireless transceiver;
receiving the reformatted second data from the second switch;
determining that the formatted second data indicates that the amount of hydrocarbons in the location in the water surrounding the offshore energy platform exceeds the predetermined threshold; and
generate the notification signal.

23. The system of claim 22, wherein the manned offshore energy platform further comprises:
an error detection system configured to verify the first and second data generated by the first and second monitoring devices.

24. The system of claim 23, wherein a satellite system sends the alert dependent on a control signal received from the error detection system, wherein the alert indicates confirmation of the notification.

25. The system of claim 19, wherein the first monitoring device uses mid-infrared spectroscopy to detect a gas.

26. The system of claim 19, wherein the unmanned offshore energy platform further comprises:
a local power unit configured to supply power to at least one from a group consisting of the first monitoring device, the second monitoring device, the first local wireless access point, the first switch, and the first wireless transceiver.

27. The system of claim 19, wherein the unmanned offshore energy platform further comprises:
a voice-over-Internet Protocol (VoIP) system wirelessly connected to the first local wireless access point for an operator to confirm the notification.

28. The system of claim 19, wherein the first wireless transceiver is further configured as a backbone for a Supervisory Control And Data Acquisition (SCADA) system.

29. The system of claim 19, wherein the first monitoring device includes at least one selected from a group consisting of a digital camera, a sensor, a computer system, a gas chromatograph, a laser emitter, and a Voice Over Internet Protocol telephone.

30. The system of claim 29, wherein the digital camera is placed in a protective housing.

31. The system of claim 19, wherein hydrocarbons in the water surrounding the unmanned offshore energy platform comprises at least one selected from a group consisting of leakage of a hydrocarbon and leakage of a gas associated with hydrocarbons.

* * * * *